June 13, 1961 R. Y. BOW 2,988,311
FISHING POLE HOLDER
Filed Aug. 17, 1959 2 Sheets-Sheet 1
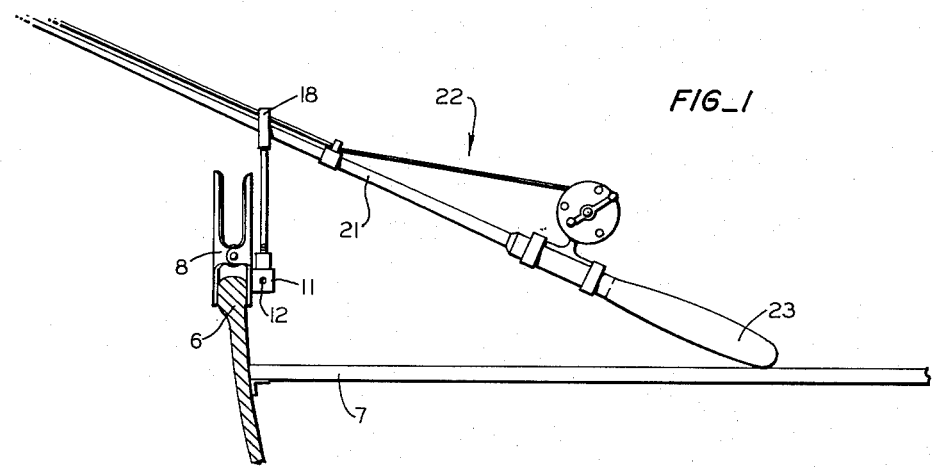
FIG_1
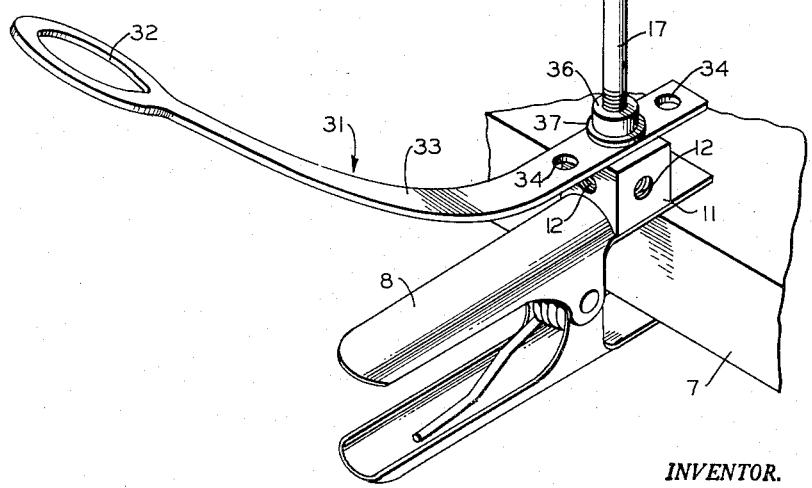
FIG_2
INVENTOR.
ROBERT Y. BOW
BY *Lothrop & West*
ATTORNEYS June 13, 1961  R. Y. BOW  2,988,311
FISHING POLE HOLDER
Filed Aug. 17, 1959  2 Sheets-Sheet 2
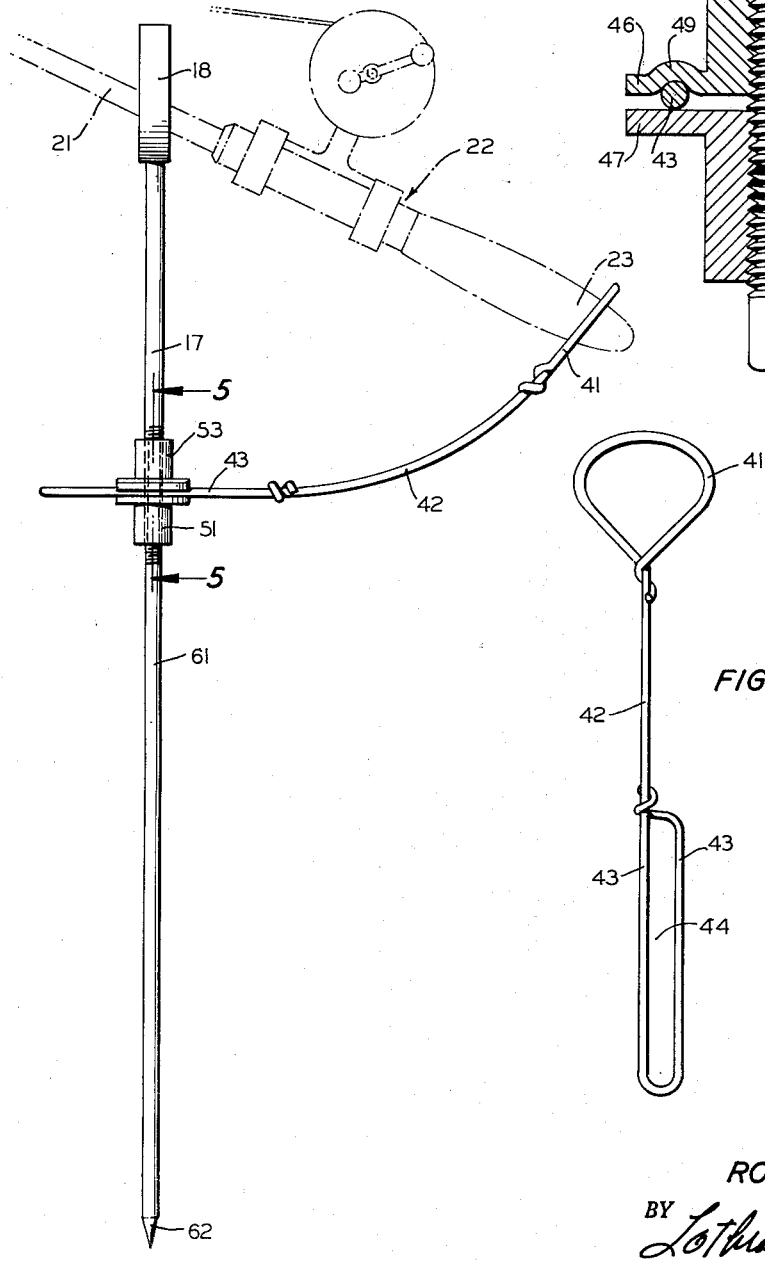
FIG_4
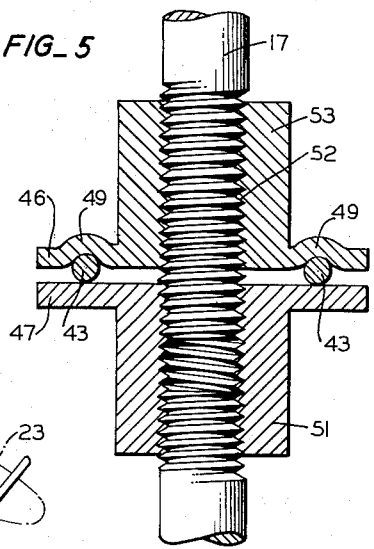
FIG_5
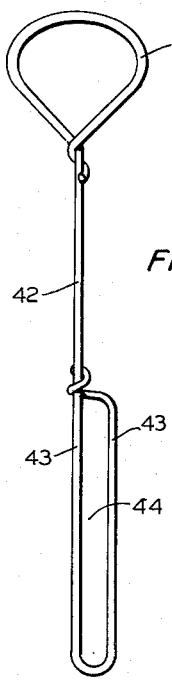
FIG_3
INVENTOR.
ROBERT Y. BOW
BY *Lothrop & West*
ATTORNEYS 2,988,311
FISHING POLE HOLDER
Robert Y. Bow, 10 Newton Way, Broderick, Calif.
Filed Aug. 17, 1959, Ser. No. 834,148
1 Claim. (Cl. 248—44)

The invention relates to devices for releasably holding a fishing pole at a predetermined angle of inclination.

It is an object of the invention to provide a fishing pole holder which is flexible in its use and operation.

It is another object of the invention to provide a fishing pole holder which is durable, light, compact and economical to make.

It is yet another object of the invention to provide a holder which cannot only be mounted in the ground but also on a great variety of supporting elements on a boat or dock.

It is still another object of the invention to provide a holder which securely retains a fishing pole at a preselected angle yet which permits a fisherman quickly to disengage a pole from the device.

It is a further object of the invention to provide a holder which is adjustable to give any predetermined angle of inclination to the pole.

It is another object of the invention to provide a generally improved fishing pole holder.

Other objects, together with the foregoing, are attained in the embodiment described in the following description and shown in the accompanying drawings in which:

FIGURE 1 is a side elevational view of one form of the invention in a typical environment;

FIGURE 2 is a perspective, to an enlarged scale, of the FIGURE 1 form of device in a different attitude and with the addition of a form of pole handle holder;

FIGURE 3 is a plan view of a modified form of pole handle holder;

FIGURE 4 is a side elevational view of a modified form of the invention; and

FIGURE 5 is a median vertical section, to an enlarged scale, of the handle holder adjustment members, the plane of section being indicated by the line 5—5 in FIGURE 4.

While the device is susceptible of numerous physical embodiments depending upon the environment and requirements of use, substantial numbers of the herein shown and described embodiments have been made and used and have performed in a very successful manner.

Adapted to be clamped on the gunwale 6 of a boat (see FIGURE 1) or on a thwart 7 (see FIGURE 2) or on any comparable external supporting members, is a spring-urged clamp 8 of appropriate size and jaw strength, such clamps being commercially available.

Mounted on one jaw of the clamp is a block member 11 having formed therein a plurality of drilled and tapped openings 12 facing in a plurality of directions.

By providing these several openings it will be found that whether the member being clamped is a gunwale, a thwart or other comparable member, at least one of the openings 12 will be facing in a vertically upward direction.

Consequently, a yoke member 16 including a threaded stem 17 having mounted thereon a bifurcated member 18, or yoke, can be screwed into an upwardly facing opening so as to assume the attitude shown in the figures.

In this vertical attitude, a rod 21 of a fishing pole 22 can be supported in the yoke 18 with its handle 23 supported on any convenient nearby surface such as the thwart 7.

While some fishermen prefer this open arrangement, there is always a risk that a sudden strike by a large fish might dislodge the pole and even pull it overboard. Consequently, as appears in FIGURE 2, there is provided a hook member 31 comprising a loop 32, or hook, mounted on the distal end of an upwardly curved strap 33 having a plurality of openings 34 formed therein to enable adjustment of the strap to be effected. By moving the strap inwardly or outwardly relative to the yoke member, the pole's angle of inclination can be changed, it being understood that the handle 23 of the pole is inserted within the encircling loop 32, or hook. A threaded collar 36 and a washer 37 effect locking.

This holding arrangement, or cooperation between the yoke and the hook, is most clearly shown in FIGURE 4. Here, a hook 41, or loop, is formed of stiff wire, the wire also forming a curved central shank portion 42 and a double track 43 defining a slotted portion 44. The track is adapted to be confined between an upper flange 46 and a lower flange 47. Preferably the upper flange 46 is provided with a pair of parallel offset portions 49 forming recesses adapted to confine the tracks 43 and thus prevent rotation of the wire hook around the vertical axis of the stem 17.

Clamping of the tracks 43 between the flanges 46 and 47 is effected by screwing upwardly on a threaded lower boss 51 in engagement with the lower threaded end 52 of the stem 17, an upper boss 53 being also provided to support the upper flange 46.

In threaded engagement with the lower boss 51 is an elongated rod 61 provided with a point 62 at its lower end, thus enabling the holder to be inserted in the ground.

A considerable amount of interchangeability of parts enables the fisherman to meet all conditions of use. It can therefore be seen that I have provided a compact, highly versatile and useful holder.

What is claimed is:

A fishing pole holder comprising a vertical rod having a threaded portion adjacent its lower end, a yoke mounted on the upper end of said rod, an upper flange in threaded engagement with said threaded portion of said rod, said upper flange being provided with a pair of downwardly facing parallel recesses, a lower flange in threaded engagement with said rod and adapted to be urged toward face-to-face engagement with said upper flange, and a stiff wire member formed at one end into a loop and at the other end into a parallel double track portion defining an elongated slot and adapted to straddle said rod with said tracks disposed within said recesses in said upper flange, said wire being selectively positioned by clamping engagement between said upper and said lower flange, said wire being curved upwardly toward alignment between said yoke and said loop.

References Cited in the file of this patent

UNITED STATES PATENTS

| | | |
|---|---|---|
| 335,503 | Butler | Feb. 2, 1886 |
| 1,703,554 | Slauter et al. | Feb. 26, 1929 |
| 2,510,181 | Jury | June 6, 1950 |
| 2,552,639 | Menegay | May 15, 1951 |

FOREIGN PATENTS

| | | |
|---|---|---|
| 378,488 | Germany | July 17, 1923 |